Figure 1:
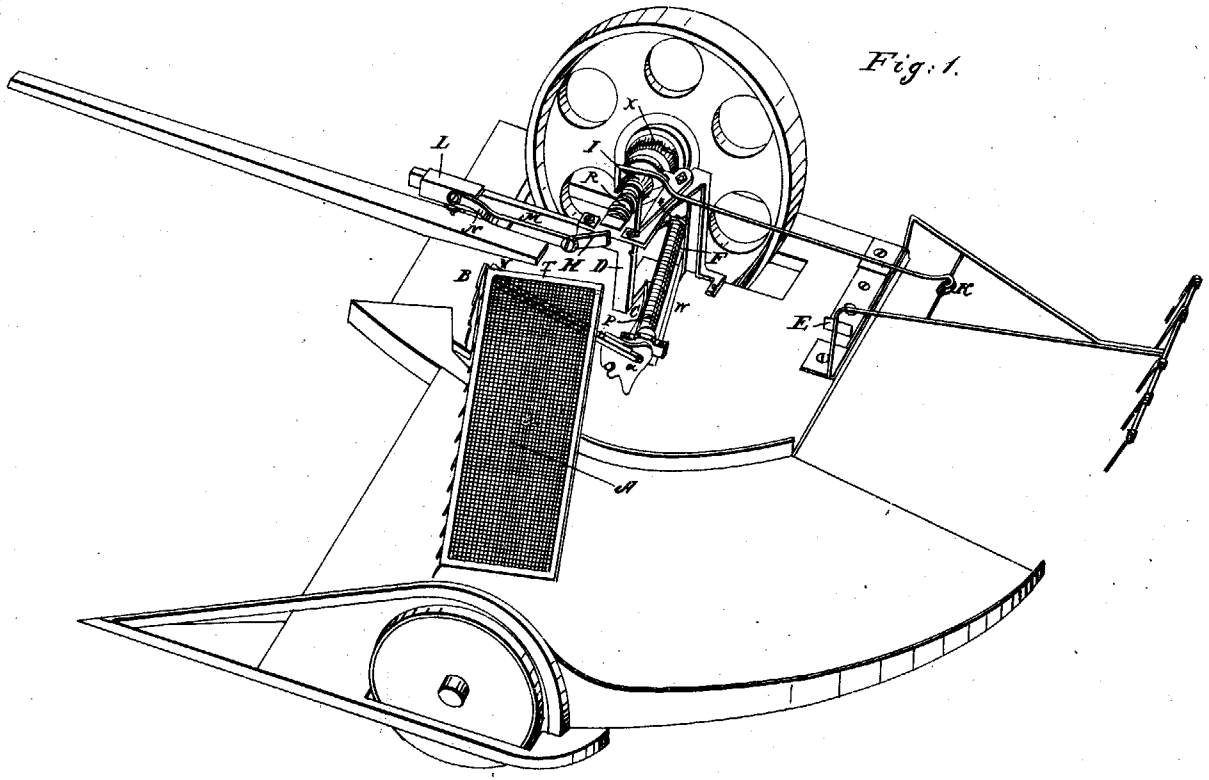
Figure 2:
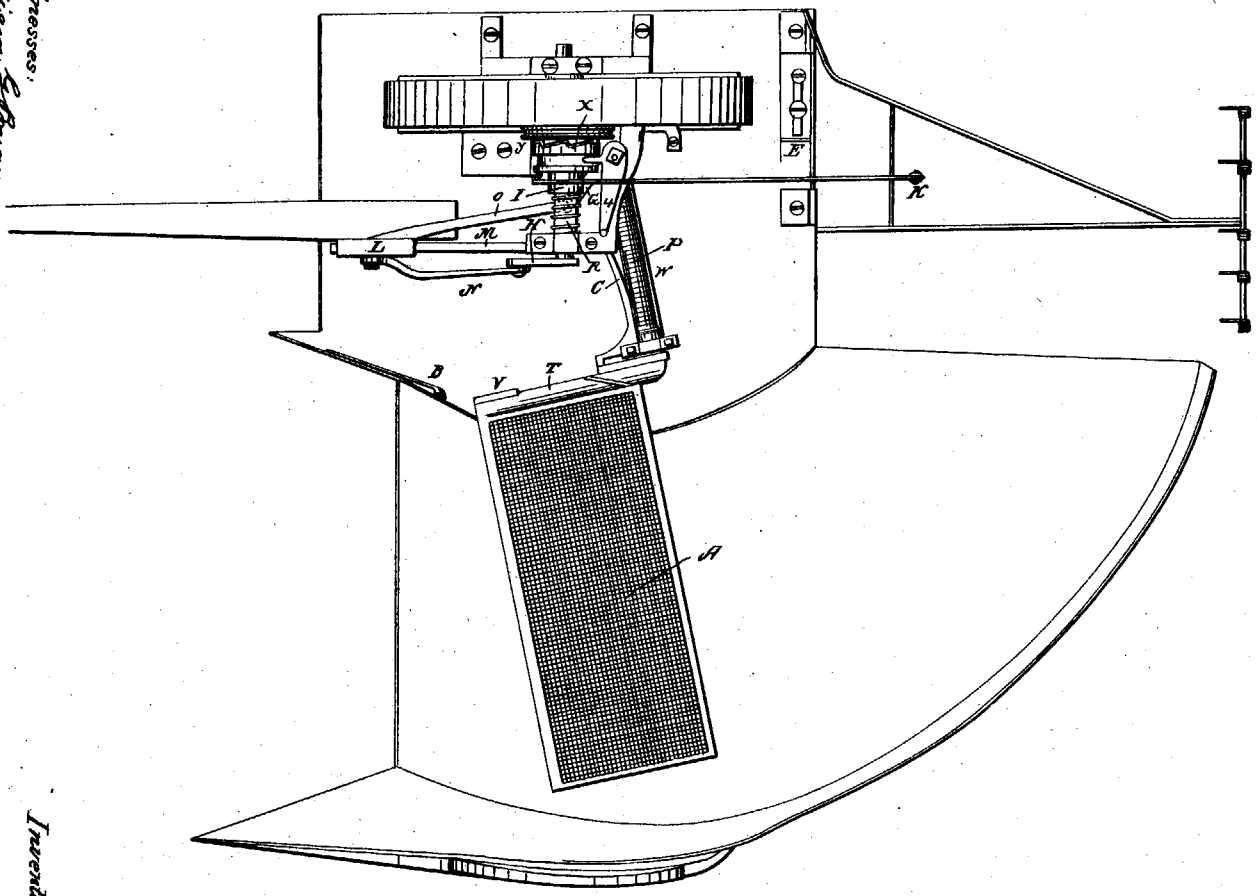

2 Sheets—Sheet 1.

C. R. BRINCKERHOFF.

Harvester.

No. 966.

Reissued May 22, 1860.

Witnesses:
William G. Bryan
John B. Upton.

Inventor:
Cornelius R. Brinckerhoff.

N. PETERS, Photo-Lithographer, Washington, D. C.

2 Sheets—Sheet 2.

C. R. BRINCKERHOFF.

Harvester.

No. 966.

Reissued May 22, 1860.

Witnesses:
William G. Bryan
John B. Upton

Inventor:
Cornelius R. Brinckerhoff

N. PETERS, Photo-Lithographer, Washington, D. C.

UNITED STATES PATENT OFFICE.

CORNELIUS R. BRINCKERHOFF, OF BATAVIA, NEW YORK.

IMPROVEMENT IN HARVESTING-MACHINES.

Specification forming part of Letters Patent No. 24,092, dated May 24, 1859; Reissue No. 966, dated May 22, 1860.

*To all whom it may concern:*

Be it known that I, CORNELIUS R. BRINCKERHOFF, of Batavia, in the county of Genesee and State of New York, have invented a new and Improved Self-Raker and Self-Gleaner and Contractor of Gavels for Harvesting-Machines; and I do hereby declare that the following is a full and exact description thereof, reference being had to the accompanying drawings and the letters of reference marked thereon.

The nature of my invention consists in the peculiar construction and application of a self or automatic raker, which shall discharge the grain from the platform and out of the way of the horses and machine on the succeeding round, and a self rear raker and gleaner, which shall glean the stubble between the gavels and contract the gavels into sheaf form, in the manner hereinafter described.

To enable others skilled in the art to make and use my invention, I will proceed to describe its construction and operation.

I make the platform in the usual form on a quarter-circle, or nearly so, that the cut grain may be delivered at the side by the rake, and will be out of the way of the team and machine on the succeeding round.

The rake-head is make of iron, with a shank (marked T) about two and a half feet long, and is then carried nearly at right angles, represented by a shaft or shank, with a spiral spring thereon, (marked P,) and is connected to the sweep-post (marked F) by a socket-joint. It is all in one piece, in the form of a crank. The arm or shank, running back upon the rake-head, instead of being arranged so as to be nearly horizontal when the rake is dropped upon the platform, may be inclined up at an angle of about forty-five degrees. Thus arranged, it would form a support for one side of a grain-divider, (marked A,) and it may be carried downward sufficiently far, that, being bent again, it may be carried thence horizontally to the sweep-post standing perpendicularly and having a gyratory motion. The horizontal part of the shank is about two feet long, and is attached to said post, and plays in a socket and is supported by a sweep extending from said post, and having on the outer end thereof a box, in which said horizontal part of said shank is supported, and which box also serves to keep the other end of the horizontal part of said shank in its socket in the sweep-post. The said sweep-post is placed in rear of the main shaft, and in such a position as to secure a motion to the rake which shall conform to the position of the cutter-bar. It has a gyratory motion, which is communicated to it by the "eighth-arm," as I designate it, which is indirectly connected with a crank upon the end of the shaft. In some machines it may be connected directly without any intervening arm or arms: I call it the "eighth-arm," because it should be located on the sweep-post at an eighth distance, or nearly so, from the point where the rake-shank plays in a socket on said sweep-post, so that the rake shall have a quarter-circle motion, more or less, according to the position of the cutter-bar, and the precise form of the platform, as being a quarter-circle, more or less. I connect the eighth-arm with another arm or pitman by a hinge, which is hinged to a gib or sleeve on a slide extending forward from the post that supports the end of the crank-shaft, and I also connect the crank that is fastened to the end of the crank-shaft by a pitman or arm hinged thereto, and also hinged to said gib or sleeve, and said crank is turned by the revolutions of the shaft with the driving-wheel. Said gib or sleeve moves backward and forward with its connections—viz., said arm marked N and said arm marked O—gives proper motion to the eighth-arm, (marked G,) which causes the sweep-post to gyrate and operate the rake backward and forward. Said sweep-post is designated in the drawings by the letter F.

It is important that the movement of the rake and its shanks T and P may be free from the impediment of any of the other mechanism of the machine, and be able to perform their office efficiently, particularly in cutting heavy or wet grain, and I have therefore arranged the slide M, the gib or sleeve L, and the arms N and O in front of the crank-shaft, and out of the way of the track of the rake and its shanks. The horizontal part of said rake-shank, which plays in a socket in said sweep-post, is marked P, and has coiled thereon a strong spiral spring, which gives force to the rake in its descent, and holds it to its work in removing the grain from the platform. This is effected by fastening one end of said spiral spring, which may be of steel wire of suitable size, to the sweep-post, or to the arm thereof, and the other end to the rake-shank near the box at the end of the shank.

It is also important to construct an automatic rake for a harvester in such a manner as not, in its return toward the cutting apparatus, to push off the cut grain from the platform in front of the cutter-bar, whereby the cutting apparatus may become clogged and grain wasted. I therefore make my rake-shank of a crank form, for the purpose of avoiding such results and to secure a more perfectly operating machine.

The slide or guide upon which the gib or sleeve moves is marked M, and the gib or sleeve is marked L. The sweep extending from said sweep-post, and which supports the rake-shank, is marked W, and upon the front side thereof I attach a catch, connected with a spring in any ordinary form. The catch is marked C, and not shown in the drawings. By means of this catch, operated by the spring, the rake is held up as it passes from the rear to the front of the platform in a horizontal position as regards the open divider, and when it has reached the proper point the catch is detached by the spring striking against the pillow-block post, (marked D,) or any suitably-arranged contrivance for this purpose, and the rake, with its divider, as they are thrown forward and down upon the cut grain by force of the spring coiled on the horizontal part of the shaft of the rake, (marked P,) and move with such celerity and precision as to cause them to pass between the stalks of the falling grain in such a manner as to perform their work properly.

In order to prevent any rebound of the rake, whereby the falling grain might be thrown from the upper surface of the divider and in front of the cutter-bar, and the machine be thereby clogged or injured and the grain wasted, and to hold it more firmly to its work, I have constructed a rack (marked B) with teeth or catches thereon, and placed it, with a spring, in such a place near the inner corner or end of the rake-head that when the rake has descended it will be arrested and held by one of the teeth or notches until it has moved back a short distance, and until the tendency to rebound is suspended.

On that part of the rake-shank marked T is fastened a piece of iron or its equivalent, (marked V,) to catch into the rack-teeth and hold the rake down. The shank marked T extends from the inner corner of the rake-head to the horizontal part of the shank of the rake. In order to divide the falling grain from that which is being removed by the rake, I attach to the rake-head, by suitable devices, as shown, a light frame for a divider. The divider is made of wire-gauze or other equivalent light material. I use wire-gauze or other similar light material because of its lightness and durability, and because it is much better than a tight roof, as it will admit of the passage of wind or air through it, which is of importance It is marked A in the drawings.

I have arranged a ratchet-clutch upon the main shaft, (marked X,) and by means of the lever (marked 4) operating in a groove the rake for removing the grain from the platform and also the rear gleaning-rake may be thrown out of gear, and the same effect is produced by backing the machine. The clutch is kept in position, however, by a spiral spring on the crank-shaft, (marked R.)

I make a casting (marked *a*) and attach the same to the outer end of the horizontal part of the rake-shank at the angle. It is slipped on said part and made fast. It forms nearly a quarter of a circle, and is made fast at the outside of the box in which said rake-shank rests. In the circular part of the casting *a*, which is below the rake-shanks T and P, there is made a notch and a projection inward on the lower side of the notch. This casting is so arranged that the lower part thereof strikes against a projection on the rear of the platform, (marked E,) as soon as the rake has delivered its gavel, and is thereby thrown up until the catch C is thrown into the notch on said casting, which must invariably be done on account of the projection on the lower side of the notch, which will prevent its slipping by and capsizing the rake, and it is thus made to take a horizontal position, so far as regards the divider, and it is carried back toward the cutter-bar in this position until the catch is detached and the rake is thrown down upon the cut grain, as before stated.

I construct my rear raker or gleaner and contractor of the gavels so as to have the same in sheaf form, ready for binding, by attaching the same to the rear part of the frame of the machine by a hinge. It may be attached to the platform. I make it with spring-teeth, so that they cannot be held or injured by stones or other ordinary obstructions, and connect it by two arms or shanks to the frame of the machine, which arms I crook or bend upward, in order to pass over the grain. On these two shanks I have a cross-piece, and attach a single arm thereto, by a loose link, K, about six inches long, which arm is carried forward over the main shaft and down perpendicularly, or nearly so, and attached to a hinge (marked Y) attached to the platform or any ordinary device on the frame.

I construct a cam on the ratchet-casting, (marked X,) which is attached to the main shaft, and by means of this cam the movement of the rear rake is so adjusted that it will rake the stubble between the gavels, and will contract the gavels into sheaf form for binding.

The eighth-arm, (marked G,) instead of being attached to the sweep-post, may be attached to the horizontal part of the shank of the rake, which plays in a socket in said sweep-post, or to the casting or sweep marked W, which supports said shank at such point as to produce the same result.

Having thus fully described my invention and its mode of construction, what I claim as my invention, and wish to secure by Letters Patent, is the following:

1. The combination of the crank operated by the main shaft with the rake and sweep-post, to which it is attached, and the eighth-arm, when arranged in the manner described.

2. The wire-gauze divider or its equivalent, when arranged on the rake-head, as set forth, to divide the falling grain from that which is being removed by the rake, as described, and for the purpose specified.

3. The pivoted sweep-post, with its eighth-arm, in combination with the crank H and the mechanism connecting them, giving the reciprocating motion to the rake, the whole being constructed, arranged, and operated substantially as described.

4. The arrangement, substantially as described, of the connecting-rods O and N, sleeve L, and slide M, in advance of and in relation to the main shaft and rake-shank, as and for the purpose specified.

5. The spring-catch marked C and dog marked *a*, in combination, and the location of said catch to break the forward motion of the rake and aid its return by the spring, substantially as described.

6. The projection on the lower side of the slot or notch in the dog to arrest the catch with certainty, in the manner described.

7. The application and arrangement of the toothed rack connected with the spring, by which the rake is caught and held after its descent upon the cut grain on the platform, and whereby its rebound is prevented and the gavel is removed with greater certainty and regularity.

8. The placing of a rake having spring-teeth in the rear of the machine for the purpose of gleaning and contracting the gavels into sheaf form, substantially as described.

9. The combination of the cam attached to the main shaft with the arm of the rear rake to cause it to pass over the gavels at the proper time, as described.

10. The ratchet-cam I and lever, in combination, substantially as described, for throwing both rakes into or out of action, as set forth.

CORNELIUS R. BRINCKERHOFF.

Witnesses:

O. S. X. PECK,

J. M. BOWMAN.